United States Patent [19]
Gaide

[11] 3,944,436
[45] Mar. 16, 1976

[54] ELECTRICAL CONNECTION BETWEEN GROUPS OF LEAD PLATES FOR ELECTRIC ACCUMULATOR ELEMENTS AND METHOD FOR FORMING THE SAME

[75] Inventor: René Gaide, Andilly, France

[73] Assignees: Societe Fulmen, Clichy; Manufacture D'Accumulateurs et D'Objets Moules, Paris, both of France

[22] Filed: Oct. 9, 1973

[21] Appl. No.: 404,574

Related U.S. Application Data

[63] Continuation of Ser. No. 213,944, Dec. 30, 1971, abandoned.

[30] Foreign Application Priority Data

Dec. 30, 1970 France .................. 70.47313

[52] U.S. Cl. .................................. 136/176
[51] Int. Cl.² ............................ H01M 10/12
[58] Field of Search .............. 136/176, 134, 166

[56] References Cited
UNITED STATES PATENTS

| | | | |
|---|---|---|---|
| 1,907,420 | 5/1933 | Finn | 136/134 R |
| 3,438,818 | 4/1969 | Rowe | 136/134 R |
| 3,494,798 | 2/1970 | Teeler et al. | 136/166 |
| 3,519,489 | 7/1970 | Port | 136/166 |

*Primary Examiner*—Howard S. Williams
*Assistant Examiner*—H. A. Feeley
*Attorney, Agent, or Firm*—Sughrue, Rothwell, Mion, Zinn & Macpeak

[57] ABSTRACT

The method comprises the steps of inserting plate lugs in the openings made in the bottom of at least one elementary mould, connecting together the plate lugs by rods formed by melting lead, and making the connection between the rods associated with plates of opposite polarities of two adjacent elements of the accumulator; the said elementary mould comprising a channel common to two adjacent elements of the accumulator. A varied version of an embodiment consists in implementing an elementary mould comprising two channels, each of them having the plate lugs of same polarity fitted in them. The invention is for use in the accumulator industry.

4 Claims, 6 Drawing Figures

3,944,436

ELECTRICAL CONNECTION BETWEEN GROUPS OF LEAD PLATES FOR ELECTRIC ACCUMULATOR ELEMENTS AND METHOD FOR FORMING THE SAME

This is a continuation of application Ser. No. 213,944, filed Dec. 30, 1971, now abandoned.

BACKGROUND OF THE INVENTION

The present invention has for its object an electrical connection between groups of lead plates for electric accumulator elements, and a method for forming connections of that type or others.

No absolutely satisfactory solution has been found for the problem of making sealed electric connections between two adjacent accumulator elements, either from the point of view of perfect sealing of the connection, or from the point of view of easy production thereof. The Applicants have perfected connections having excellent sealing characteristics, which are the object of their French patent application No. 69.04 068 of Feb. 19, 1969, but requiring the use of at least one seal per connection. They have also studied an extremely rapid method for manufacturing rods for connecting together plates of same polarity of an element, and connections of rods for plates of opposite polarity of adjacent elements, the plates being arranged in the accumulator box already provided with its lid, which was the object of their French Pat. No. 69.08 974 of March 26, 1969. This method does not, however, enable the production of connections between adjacent elements as well sealed as the sealed connections in their aforementioned patent application, and requires the use of certain tooling adapted to the dimensions, and more particularly, to the number of elements, of the accumulators to be produced.

With a view to making strictly sealed connections, the Applicants have described, in French Pat. No. 69.39 218, a method for forming connections between lead plates of electric accumulators, in which method an elementary mould is fitted on the plate lugs arranged in an element of the accumulator, then molten lead is run into that mould so as to connect the plate lugs together by rods, and the rods of the plates of opposite polarity are connected through holes provided in the partition separating two adjacent elements, these operations being made preferably before the fixing of the accumulator lid on its box.

The mould provided for surrounding the plate lugs of same polarity has the general shape of a channel, preferably having a flat bottom, whose bottom is drilled with rectangular openings having a cross-section firstly equal to those of the plate lugs, then tapering downwardly, preferably in the shape of a truncated pyramid with a rectangular base.

SUMMARY OF THE INVENTION

The present invention proposes to make such connections by an appreciably modified method, using, more particularly, either an elementary mould having a different structure, or parts moulded onto the accumulator box.

The invention, therefore, has for its object a method of forming lead plates on an electric accumulator having several elements, and for interconnecting the plates of the elements by melting the plate lugs, in which the plate lugs arranged in an element of the accumulator are inserted in the openings made in the bottom of at least one elementary mould, the plate lugs then are connected together by rods produced by melting the lead, and the connection of the rods associated with the plates of opposite polarities of two adjacent elements of the accumulator is made, these operations being carried out preferably before the fixing of the accumulator lid on its box, characterised in that the elementary mould comprises two channels, each of these having the plate lugs of same polarity fitted in them.

It must be understood that the method which is the object of the present invention enables electrical connections having the advantage of sealing previously obtained to be produced.

It must be stated, moreover, that such a method enables the avoidance of the use of connection rods having special shapes formed by moulding, and having an appreciable cost price.

Also, it should be observed that such a process ensures a reduction in the length of the electric connection circuit as well as an appreciable gain in the weight of the lead alloy used.

Further, it should be noted that the upper faces of the channels of the walls of the box, as well as of the partitions, are arranged substantially in a same plane, so that fixing of the accumulator lid on the box is effected in a particularly easy way by thermo-welding.

Likewise, the implementing of the invention enables the avoidance of the use of numerous tools such as welding combs and the like adapted to each type of accumulator, with a view to making such connections. Moreover, it is not necessary to create a special work station, which would be difficult to automate, on the production line.

It should be observed also that the moulds are inserted in the elements of the battery and remain therein after the lid has been welded. The result is that they subsequently resist all possible deformation of the walls, thus ensuring a forming function.

Moreover, they can, to great advantage, comprise a reference of the electrolyte level, as well as a deflecting orifice preventing any splashing of acid towards the upper part of the battery.

BRIEF DESCRIPTION OF THE DRAWINGS

Other characteristics and advantages of the invention will become apparent from the following description, given by way of a merely illustrating and non-limiting example, with reference to the accompanying drawings and diagrams, in which.

DESCRIPTION OF THE PREFERRED EMBODIMENTS

Figure 1:
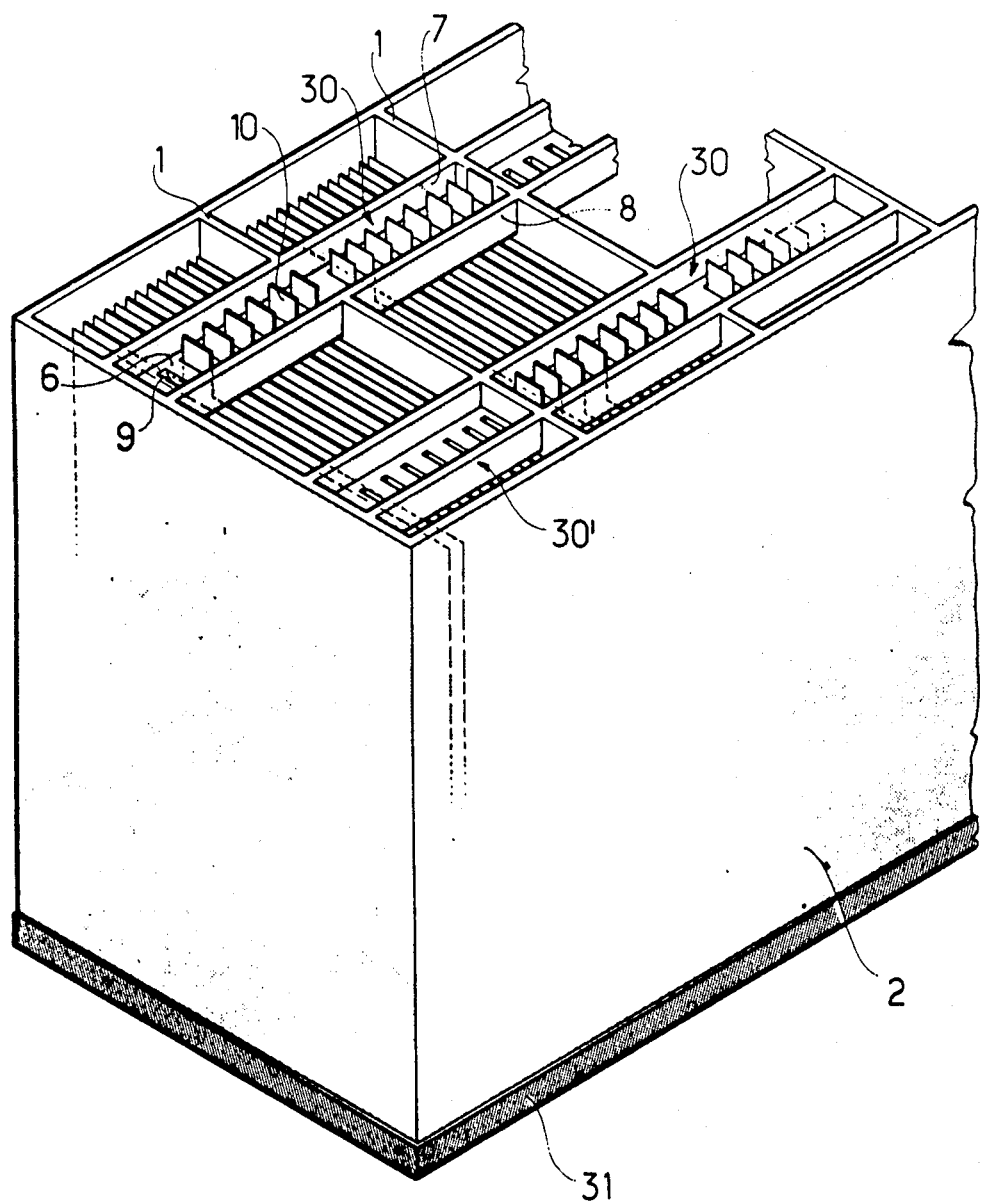
FIG. 1 is a perspective view of an accumulator box comprising an elementary mould consisting of a channel common to two adjacent elements, and moulded onto the box, according to the present invention.

Thus, FIG. 1 shows the box 2 of an accumulator battery whose elements are limited by partitions 1, the lid of such a battery being assumed to be detached from the box. Such a box comprises, at its upper part, channels 30, each of these being common to two adjacent elements of the battery, with the exception of the end channels 30' used for forming, more particularly, the end terminals. Such channels are moulded onto the box itself, made of plastic material such as polypropylene or a copolymer of ethylene and propylene, actually implementing any appropriate shaping technique.

Inasmuch as concerns the channels 30, they comprise a flat bottom 6 arranged between two rims 7 and 8, the said bottom being provided with rectangular openings 9 having a cross-section substantially equal to that of the plate lugs 10. Moreover, the openings 9 can also comprise means (not shown) such as chamfers ensuring the guiding of the plate lugs when they are inserted. Of course, each channel has the plate lugs of an element of given polarity, as well as the plate lugs of the adjacent element of opposite polarity fitted to it.

The forming of the connections is effected in the following manner:

The box 2 being assumed to be in an upturned position, the plate lugs 10 are inserted in the openings 9 of the channels 30. The welding of the bottom 31 of the box onto the box itself is then effected, and the latter is up-turned so that it assumes the position illustrated in FIG. 1. The melting of the plate lugs 10 can then be effected, such an operation being carried out, for example, either by means of a blow-pipe or by means of a heating rod, or by implementing turns through which a high-frequency current flows. Preferably, the plate lug assembly comprises a sufficient quantity of lead for producing, after melting and cooling, the rod for connecting elements together. Of course, such a melting can be produced by casting lead in the channels, in a quantity corresponding to the dimensions of the connections to be made.

The last operation consists in welding the lid onto the box 2, such an operation being, to great advantage, and very easily, effected by thermo-welding, the upper faces of the channels, of the box walls, as well as of the partitions, being arranged in a same plane.

Figure 2:
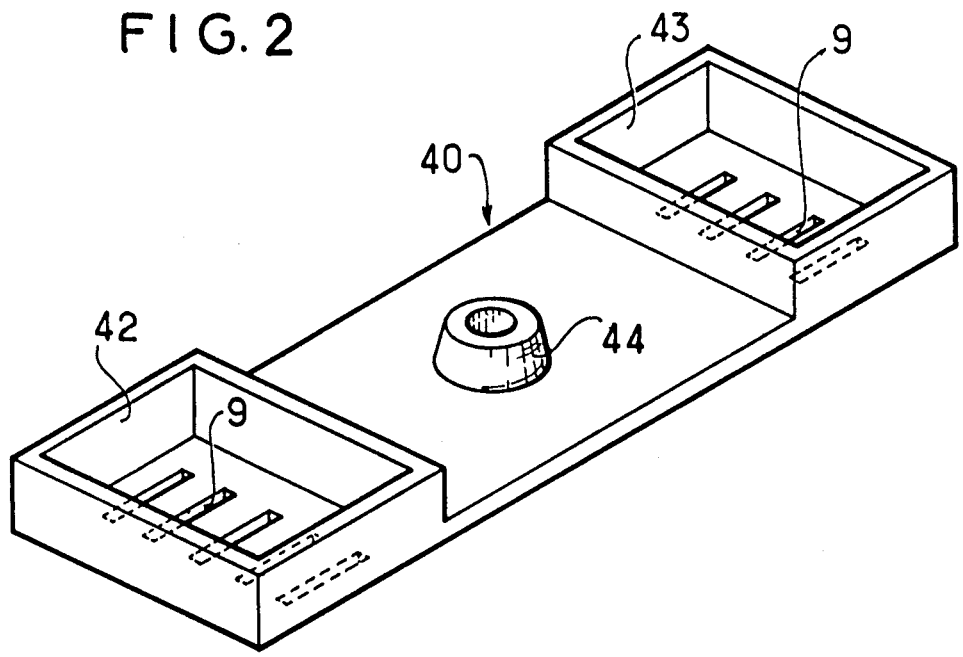
FIG. 2 is a perspective view of a self-contained elementary mould provided with two channels according to the invention, comprising an electrolyte level indicator.

FIG. 2 shows a self-contained elementary mould having a flat bottom 40 in its assembly, and intended for surrounding the plate lugs of an accumulator element. The mould comprises two channels 42 and 43 provided with openings 9 having a cross-section which, firstly, is equal to those of the plate lugs, then tapering downwards in the shape of a truncated pyramid having a rectangular base. The mould comprises, at its central portion, an electrolyte level indicator 44. Such a mould may be made of a suitable plastic material, implementing any appropriate shaping technique.

Figure 3:
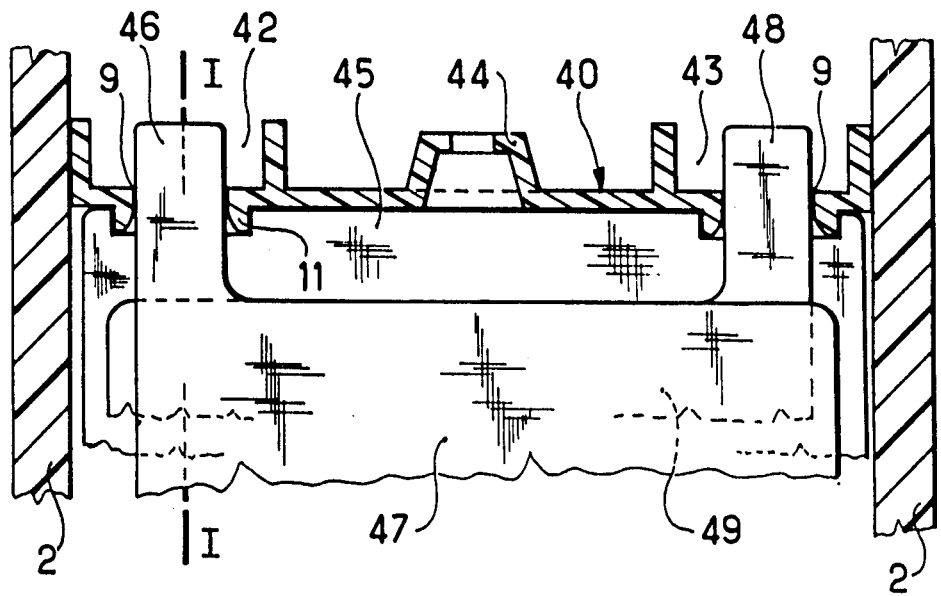
FIG. 3 is an elevational view in section of an elementary mould according to the invention, inserted in an element of the battery, and resting on the separators.

FIG. 3 shows such an elementary mould 40 inserted in an accumulator element, limited, in that figure, by the walls of the box 2 and resting laterally against these walls and likewise against the element separating partition 1 (FIG. 4), with the mould 40 resting, moreover, on the separators 45. It can be seen, in FIG. 3, that the lugs 46 of the positive plates 47, for example, are fitted into the openings 9 made in the bottom of the channel 42, whereas the lugs 48 of the negative plates 49 are fitted into the openings 9 of the channel 43. FIG. 3 also shows skirts 11 providing guiding means for the plate lugs when they are inserted in the openings 9.

Figure 4:
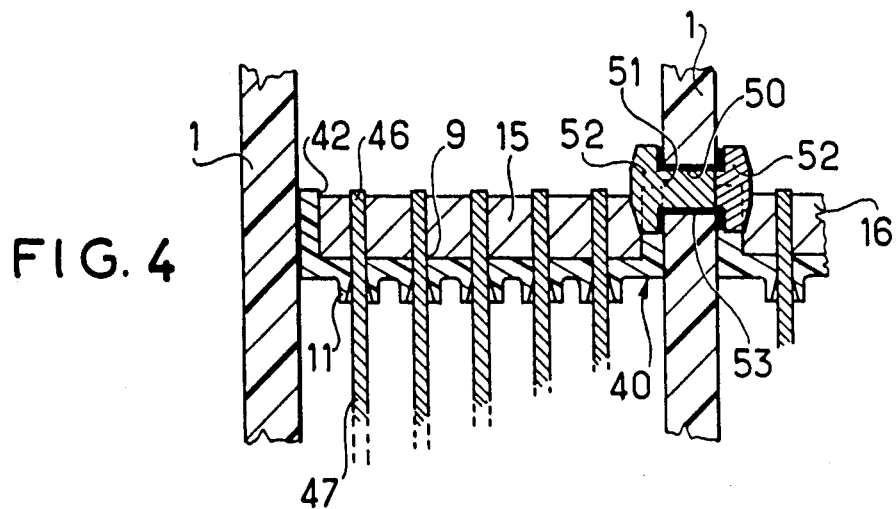
FIG. 4 is a sectional view taken substantially along the line I—I of FIG. 3.

FIG. 4 shows, in a sectional view along the line I—I of FIG. 3, such an arrangement of the mould 40 on the lugs 46 of the positive plates 47. Moreover, FIG. 4 shows an orifice 50 formed in the accumulator element separation partition 1 in which a connection rod 51 has been formed by welding two tabs 52 together, a seal 53 being, to great advantage, inserted between the rod 51 and the orifice 50.

Figure 5:
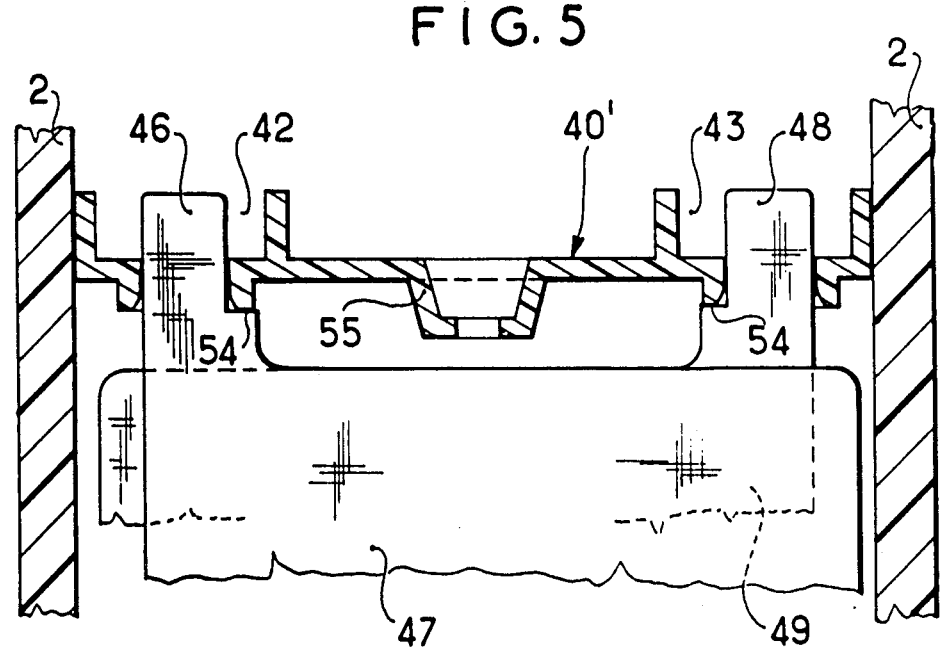
FIG. 5 is an elevational view in section of an elementary mould according to the invention, inserted in an element of the battery on the plate lugs and comprising a deflecting unit.

FIG. 5 shows that the elementary mould referenced 40' in this case can rest on the lateral rims 54 arranged on the lugs 46 and 48 of the positive plate 47 and negative plate 49, respectively. Likewise, ribs (not shown) can be provided on the inner face of the partitions of the element and of the box, and can use the mould 40 or 40' as a resting member.

Moreover, FIG. 5 shows that the mould 40' comprises, at its central portion, a deflector 55 which serves to prevent any splashing of electrolyte towards the upper part of the accumulator.

With further reference to FIG. 4, as previously mentioned, the connections between the plates of one element and the plates of an adjacent element are formed by melting the lugs 46, 48 of both positive and negative plates, such melting being effected either by means of a blow-pipe or a heating rod, or by casting lead in the channels 42 and 43 of the moulds 40 or 40'; or by means of turns through which a high-frequency current flows.

Thus, after the solidifying of the lead, the rods 15 and 16 in two neighboring elements are interconnected by means of the previously welded tabs 52, and connected by their lower portion to the rods, such connection being effected at the same time as that of the plate lugs.

It is also possible to connect the rods 15 and 16 together by direct moulding of the lead coming from the melting, through one or several orifices provided in the element separating partition, the tabs 52 not being used in this case, of course.

It has been assumed, in the above, that the elementary moulds 40, 40' were self-contained and fitted to the plate lugs of each element manually, the plates being previously arranged in the box after the bottom has been welded on the latter.

Figure 6:
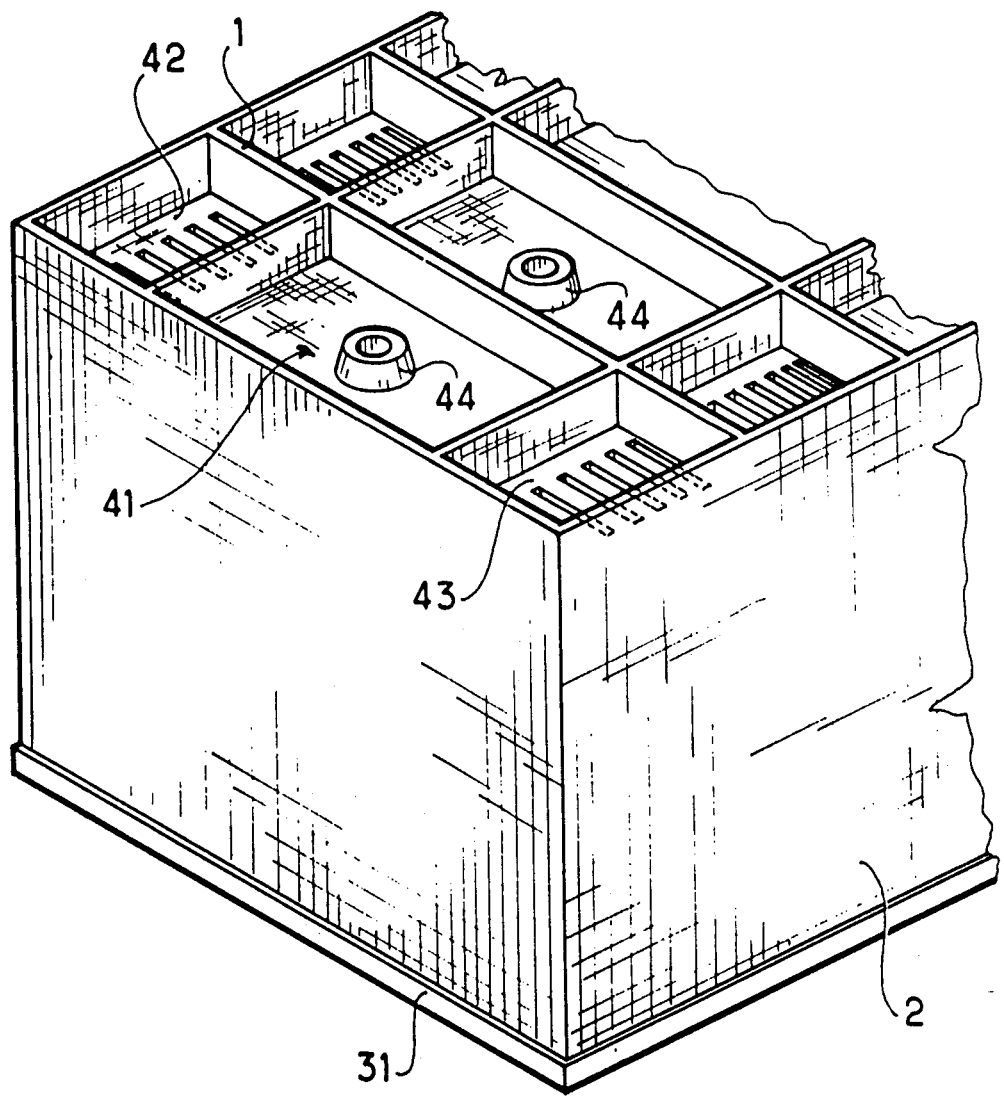
FIG. 6 is a perspective view of an accumulator box comprising elementary moulds moulded onto the said box according to the invention.

Of course, as shown in FIG. 6, it is possible to produce a box 2 comprising, for each element, an elementary mould 41, the assembly forming one moulded piece. In this case, it being assumed that the box 2 is in the up-turned position, the plate lugs are inserted in the channels 42 and 43 of the moulds 41, then the bottom 31 is welded onto the box 2 itself and the latter is up-turned. The melting of the plate lugs can then be effected as previously described.

In any case, the last operation consists in welding the cover onto the box 2, such an operation being, to great advantage, and easily, effected by thermo-welding.

The invention can be implemented in all types of accumulator batteries.

It must be understood that the invention is in no way limited to the embodiments described and illustrated, which have been given merely by way of examples. More particularly, without going beyond the scope of the invention, details may be modified, certain arrangements may be changed or certain means may be replaced by equivalent means.

What is claimed is:

1. A method of constructing a multi-cell storage battery comprising the steps of:

molding a container of plastic in one piece with outer vertical container walls, an open bottom, longitudinally-spaced transversely extending vertical cell partitions and transversely-spaced parallel channels extending longitudinally across the top of the container from and facing upwardly and outwardly of the container, said parallel channels being partially formed by upright spaced walls, the upper faces of said outer vertical container walls, said spaced upright walls defining said channels and said transversely extending partitions being coplanar, said channels having sections spanning adjacent cells and extending through the cell partition separating said adjacent cells, forming longitudinally-spaced openings within the base of the channels for receiving plate lugs of the same polarity, inserting a plurality of battery plates through the open bottom of said container when said container is in an inverted position with the edges of the plates contacting the undersides of the channel base and with the lugs inserted within respective openings within the base of said channels, sealably coupling an imperforate bottom member to the open bottom of the container to fixedly locate said plates therein, electrically and mechanically coupling the lugs within channel sections together by at least melting said lugs within said channel sections to form strap connectors therein, and thermal welding a lid onto the container top at the coplanar upper faces of the upright walls defining said channels, the container walls, and the longitudinally-spaced paritions to seal the strap connectors within said channel sections.

2. The method as claimed in claim 1 wherein said step of electrically and mechanically coupling lugs within channel sections comprises filling said channel with molten lead and thereafter cooling said lead.

3. A multi-cell storage battery comprising: a one-piece; molded, open-bottom, plastic container including edge joined vertical outer container walls, said container having molded therein longitudinally-spaced, upright cell partitions and transversely-spaced parallel channels partially formed by upright, transversely-spaced walls extending longitudinally across the top of said container from end-to-end and facing upwardly and outwardly of the container, said channels alternately extending through respective cell partitions to form channel sections spanning the cells, the upper faces of said container walls, the vertical upright walls partially defining said cell partitions and said channel walls being coplaner, the base of said channels being provided with longitudinally-spaced openings for receiving plate lugs of the same polarity when a plurality of plates are inserted through the open bottom of said container when the container is in the inverted position with the edges of the plates contacting the undersides of the channel base, an imperforate bottom member sealed to the open bottom of the container to fixedly locate the plates therein, said lugs being melted within said channel section to form strap connectors therebetween and a lid thermoplastically sealed to the coplanar upper faces of said cell partitions, and said walls forming said channels to seal said formed strap connectors within respective channel sections.

4. The multi-cell storage battery as claimed in claim 3 wherein said lug receiving openings within the base of said channels have a cross-section adjacent to the upper surface of the channel which corresponds to that of the plate lugs projecting therethrough and wherein said openings taper downwardly and outwardly therefrom in the shape of a truncated pyramid at the bottom halves of said openings only to facilitate insertion of the lugs within the channel openings during assembly of the battery and wherein the upper ends of the openings closely conform to the lugs to securely locate the lugs therein.

* * * * *